United States Patent
Dieterich et al.

(12)

(10) Patent No.: US 6,174,398 B1
(45) Date of Patent: Jan. 16, 2001

(54) METHOD OF PRODUCING THE COMPOSITE METAL-AND-PLASTIC COMPONENTS OF AN ANTIBALLISTIC GRILL FOR AN ARMORED VEHICLE

(75) Inventors: Günter Dieterich, Dortmund; Karlheinz Piel, Schwerte; Lothar Pleugel, Iserlohn, all of (DE)

(73) Assignee: Fried Krupp AG Hoesch-Krupp, Dortmund (DE)

(*) Notice: Under 35 U.S.C. 154(b), the term of this patent shall be extended for 0 days.

(21) Appl. No.: 09/066,205

(22) Filed: Apr. 24, 1998

(30) Foreign Application Priority Data

May 22, 1997 (DE) .............................................. 197 21 378

(51) Int. Cl.[7] .............................. B32B 31/26; F41H 5/04
(52) U.S. Cl. .................. 156/228; 156/272.4; 156/273.9; 156/275.7; 219/633; 89/36.02; 296/188; 296/194
(58) Field of Search .................................... 156/228, 245, 156/272.4, 273.9, 275.7; 219/633, 634; 89/36.02, 36.08; 296/188, 194; 428/911

(56) References Cited

U.S. PATENT DOCUMENTS

| 2,399,184 | * | 4/1946 | Heckert ................................ 428/911 |
| 5,641,933 | * | 6/1997 | Kim ..................................... 89/36.02 |
| 5,760,379 | * | 6/1998 | Matsen et al. ....................... 219/633 |
| 5,793,024 | * | 8/1998 | Matsen et al. ....................... 219/633 |

* cited by examiner

Primary Examiner—Michael W. Ball
Assistant Examiner—Michael A Tolin
(74) Attorney, Agent, or Firm—Max Fogiel

(57) ABSTRACT

A method of fabricating the composite metal-and-plastic components of an antiballistic grill for an armored vehicle. Each component comprises a core in the form of a length of structural section with layers of plastic against each side bonded to the core by heat and pressure in a mold comprising two halves. The object of the present invention is simpler and more economical lamination in the fabrication of non-flat work with a metal core. The core is electrically heated to a prescribed processing temperature by regulating a current of electricity, whereby the resulting heat is employed to soften to a prescribed extent adhesive between the core and the layers of plastic to be bonded to it.

8 Claims, 2 Drawing Sheets

METHOD OF PRODUCING THE COMPOSITE METAL-AND-PLASTIC COMPONENTS OF AN ANTIBALLISTIC GRILL FOR AN ARMORED VEHICLE

BACKGROUND OF THE INVENTION

A method of fabricating composite metal-and-plastic components is known from European Patent 0 732 234 A2, Layers of plastic are applied (laminated) to the top and bottom of sectional metal cores (bars). Layers of woven plastic fabric are bonded together, and the resulting sandwiches to the metal core with both thermoplastics and duroplastics.

Both vacuum sacking and pressing are employed to fabricate such work (both techniques being described in M. Fleming, G. Ziegmann, and S. Roth, Faserverbundweisen, Berlin, Heidelberg, and New York, Springer, 1996).

Common to both techniques is that, to bond together moldings with many angles, they use molds in the form of upper and lower halves to achieve the desired geometry. Both techniques also depend on indirect supply of the requisite heat. That heat must be diverted entirely out of the finished work by subsequent cooling once the reaction is complete.

In vacuum sacking, the loosely joined separate layers of the eventual composite must be secured in molds entirely enclosed in a sack, which is then totally evacuated to apply pressure by way of woven auxiliary structures. Subsequent to this preparatory phase the total package is heated, either with hotplates or in an enclosed oven. The heating stage, with a maximum temperature of approximately 200° C., is immediately followed, especially in the case of thermoplastics, by a cooling stage at the same pressure to stabilize the molding.

When the components are fabricated by pressing, the requisite pressure is generated (hydraulically, pneumatically, or mechanically) with a press. The individual layers of the eventual work are, when they are not flat, secured in press molds (with an upper and a lower half).

The mold is heated with either an electric hotplate or a hot fluid and cooled with cooling devices.

Due to the physics of heat conduction and transfer, the heating and cooling stages in both procedures are relatively lengthy. This in turn dictates relatively long processing and a relatively low output per unit of time and per tool.

A method of joining the components of motor-vehicle lamps and headlights together is known from German 2 740 071 A1. Plastic reflectors are joined along the edges to housings with a transparent disk over the front. A spiral metal coil is inserted between the edges of the parts and heated. The coil is part of the tool and not of the work. It initially extends into the softened plastic of the edge. Once the heating of the fastener is discontinued and the plastic in the reflector and housing hardens again, the parts are joined to the disk by a layer of adhesive. This known method, however, provides no suggestion as to how to attain the object of the present invention.

SUMMARY OF THE INVENTION

That object is a method of the aforesaid genus that will simplify and improve the economics of lamination in the fabrication of non-flat components with a metal core like those described in European Patent 0 732 234 A2 for example.

Directly heating the metal core exploits the core's inherent heat to fasten it to the upper and lower halves, which are themselves laminates, which it is practical to provide prefabricated and which are usually not electrically conductive.

The metal core's inherent heat softens the thermoplastic or duroplastic masses, usually sheets, between the core and the mold halves and renders them adhesive. The sheets can already be part of the prefabricated upper and lower halves and can be of the same or of a different material. The three layers of the work, i.e. The upper layer, the lower layer, and the core, are then bonded together form-fit and force-fit by the application of external pressure, preferably in a press.

Both the heating phase and the subsequent cooling phase are much shorter in the method in accordance with the present invention than at the state of the art. Whereas the heat must be diverted from the whole molding in the state-of-the-art methods hereintofore described, only the heat of the core, previously heated to processing temperature, must be diverted in accordance with the present invention. Since the heat employed in accordance with the present invention is considerably lower than the heat employed at the state of the art, the overall procedure will take much less time.

Another positive result of the method in accordance with the present invention is the definitely decreased tendency of the upper and lower halves and core of the molding to shift ("float") relative to one another. This factor increases precision and manufacturing reliability.

To reduce any contamination of the metal core that might be deleterious to adhesion, the core should be heated electrically, either by regulated current flow (resistance heating) or by regulated high-frequency heating (the generation of eddy currents in the core). These two types of electrical heating will allow the application of pressure to the layers being bonded together even during the heating phase. Both procedures can accordingly be carried out simultaneously.

BRIEF DESCRIPTION OF THE DRAWINGS

The method in accordance with the present invention will now be specified with reference to the accompanying drawing, wherein

FIG. 1 illustrates the principle involved in the simultaneous application of heat and pressure in a method employing resistance heating.

Figure 1:
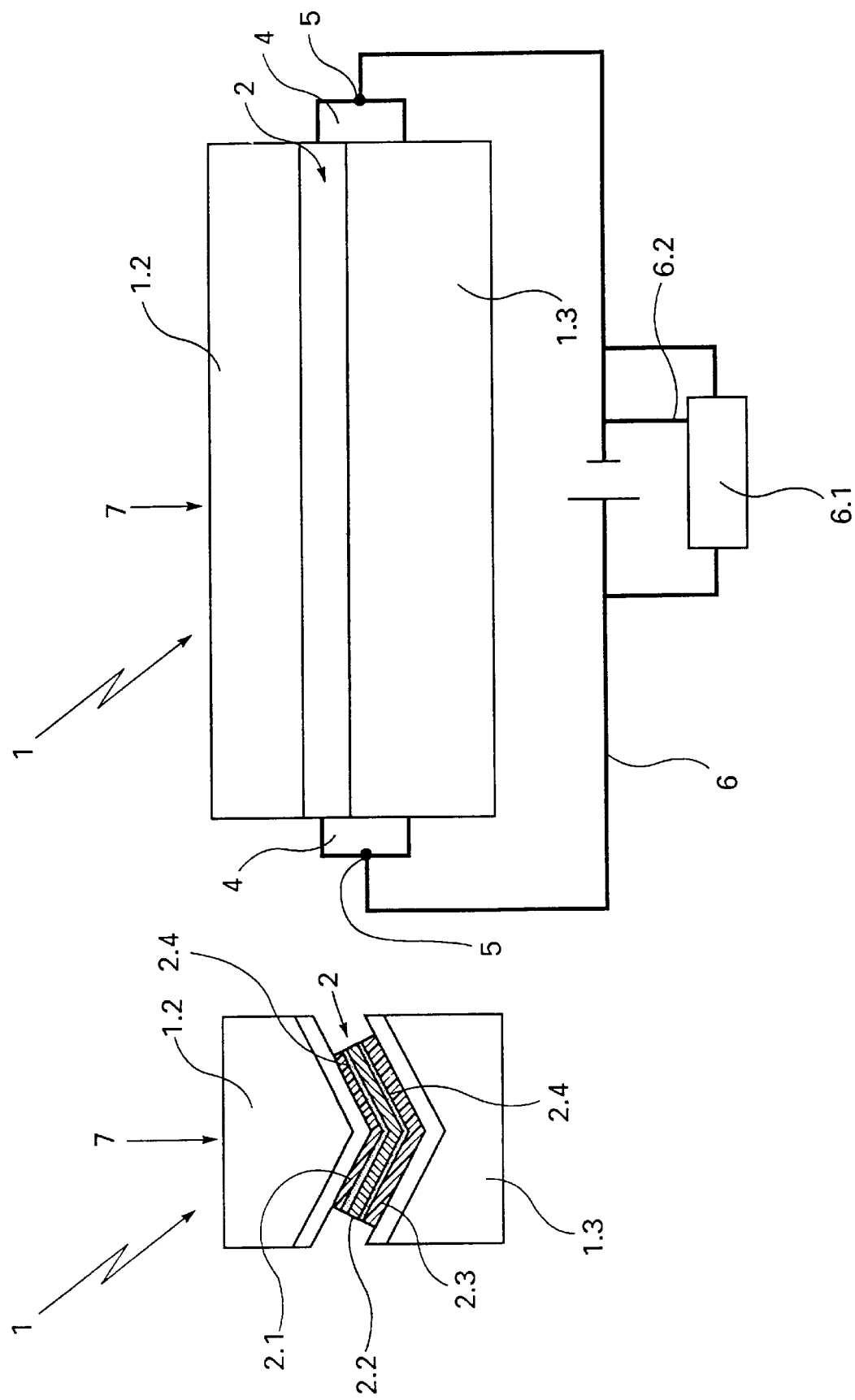
FIG. 1 illustrates one embodiment of the method in accordance with the present invention and FIG. 2 another embodiment of the same method.

Work 2 that is to be laminated and comprises an upper layer 2.1, a metal core 2.2, and a lower layer 2.3 is placed in a mold 1 comprising an upper half 1.2 and a lower half 1.3. Core 2.2 is a length of angled section long enough for its ends 4 to extend beyond layer 2.1 and lower layer 2.3 and contact the contacts 5 of an electric circuit 6. A regulator 6.1 controls the electricity in circuit 6 in accordance with the prescribed level of temperature to be attained in core 2.2 as a function of time. A heat sensor 6.2 in circuit 6 compares the actual and ideal temperature conditions. Pressure is applied to work 2 by a mechanism 7. Between the various layers of work 2 are sheets 2.4 of adhesive.

Figure 2:
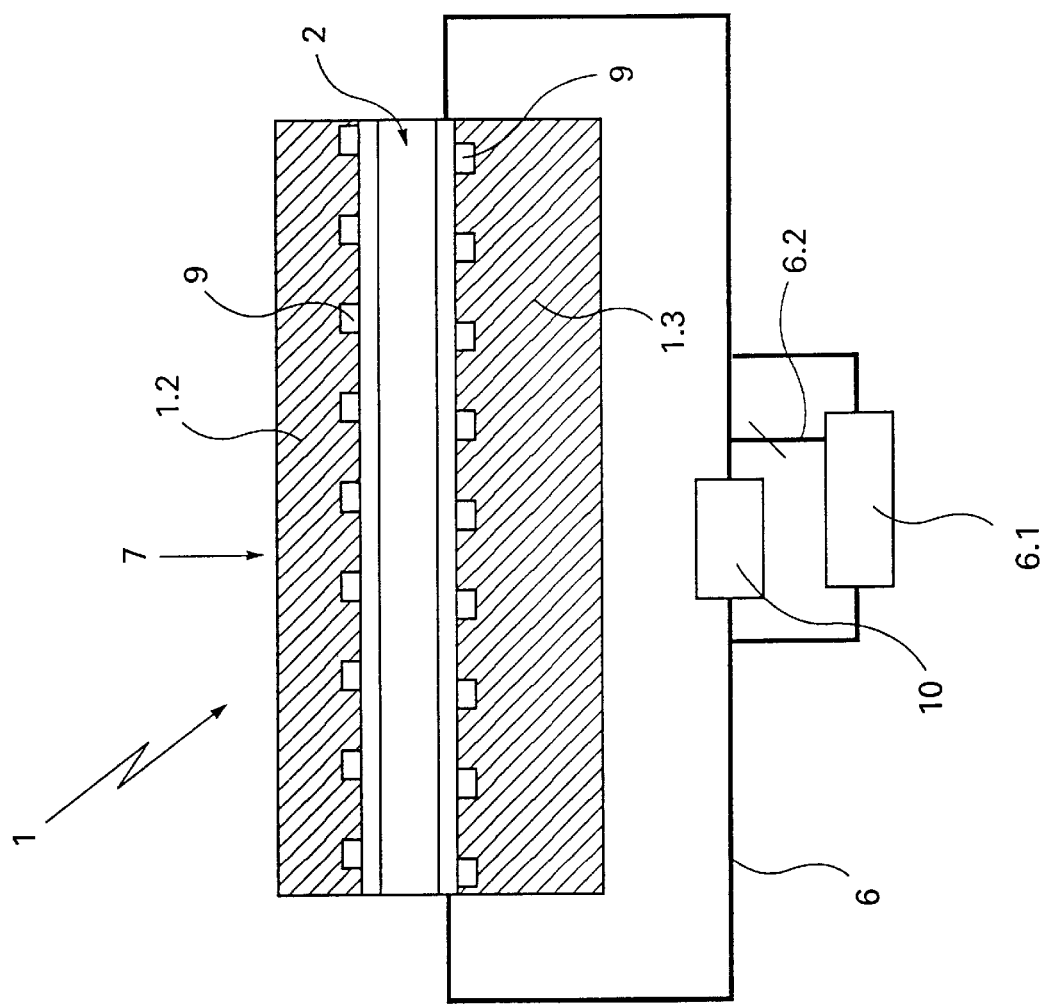
Figure 2:
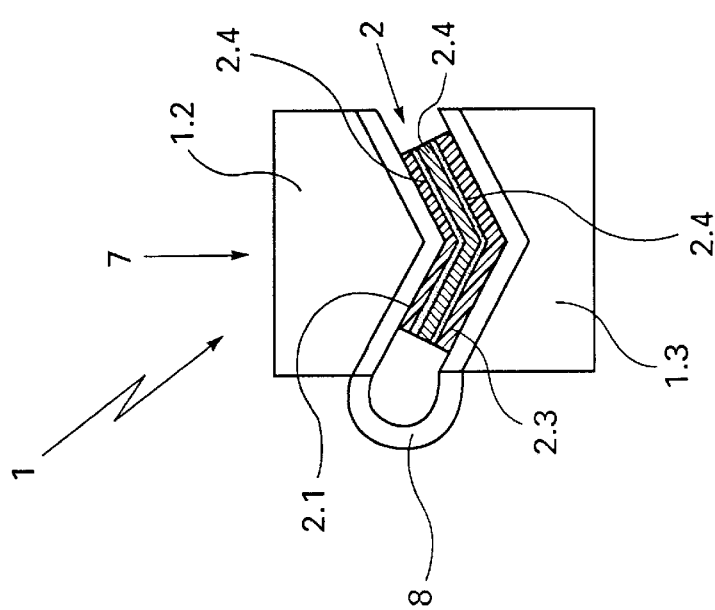

FIG. 2 illustrates the principle involved in the simultaneous application of heat and pressure in a method employing inductance heating.

Work 2 that is to be laminated and comprises an upper layer 2.1, a metal core 2.2, and a lower layer 2.3 with sheets 2.4 of adhesive between them is again placed in a mold 1 comprising an upper half 1.2 and a lower half 1.3. Core 2.2 is a length of angled section. An inductor 8 or 9 is entirely integrated into upper half 1.2 and lower half 1.3 and is strong enough to accommodate all the force exerted by pressure-application mechanism 7. The output of a high-frequency generator 10 in circuit 6 is regulated by regulator 6.1 to ensure the requisite level of temperature in core 2.2 over time. The actual temperature of the core is measured by heat sensor 6.2 and the appropriate electrical parameter forwarded to regulator 6.1.

What is claimed is:

1. A method for fabricating a composite metal-and-plastic component of an antiballistic grill for an armored vehicle, comprising the steps of: producing a non-flat core in form of a length of structural section with sides; bonding non-flat layers of plastic on each of said sides to said non-flat core by heat and pressure in a mold having two halves; providing an adhesive between said non-flat core and each of said non-flat layers of plastic; heating said non-flat core electrically to a specific processing temperature by regulating an electrical current softening said adhesive between said non-flat core and said non-flat layers of plastic to a specific extent from resultant heat so that softening of said adhesive between said non-flat core and said layers is restricted to a given specific time for preventing shifting of parts of said non-flat core relative to one another, said electrical current being regulated to soften said adhesive by heating said non-flat core.

2. A method as defined in claim 1, wherein said core is metal, said metal core being heated inside said mold.

3. A method as defined in claim 1, wherein said core is metal, said metal core being heated by inductance heating from an inductor integrated into said mold.

4. A method as defined in claim 1, wherein said core is metal; and controlling electric current for heating said metal core by regulators and heat sensors.

5. A method as defined in claim 1, wherein said temperature in said core is a function of time.

6. A method as defined in claim 1, wherein said heat and pressure are applied simultaneously.

7. A method as defined in claim 1, wherein said core is V-shaped.

8. A method for fabricating a composite metal-and-plastic component of an antiballistic grill for an armored vehicle, comprising the steps of: producing a non-flat core in form of a length of structural section with sides; bonding non-flat layers of plastic on each of said sides to said non-flat core by heat and pressure in a mold having two halves; providing an adhesive between said non-flat core and each of said non-flat layers of plastic; heating said non-flat core electrically to a specific processing temperature by regulating an electrical current softening said adhesive between said non-flat core and said non-flat layers of plastic to a specific extent from resultant heat so that softening of said adhesive between said non-flat core and said layers is restricted to a given specific time for preventing shifting of parts of said non-flat core relative to one another, said electrical current being regulated to soften said adhesive by heating said non-flat core; said core being metal and being heated inside said mold; and controlling electric current for heating said metal core by regulators and heat sensors, said temperature in said core being a function of time, said heat and pressure being applied simultaneously, said core being V-shaped.

* * * * *